United States Patent
Yang et al.

(10) Patent No.: US 11,109,255 B2
(45) Date of Patent: Aug. 31, 2021

(54) METHOD AND WIRELESS DEVICE FOR PERFORMING MEASUREMENT IN NR FOR 5G

(71) Applicant: LG Electronics Inc., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/609,173

(22) PCT Filed: Apr. 26, 2018

(86) PCT No.: PCT/KR2018/004863
§ 371 (c)(1),
(2) Date: Oct. 28, 2019

(87) PCT Pub. No.: WO2018/199653
PCT Pub. Date: Nov. 1, 2018

(65) Prior Publication Data
US 2020/0100131 A1 Mar. 26, 2020

Related U.S. Application Data

(60) Provisional application No. 62/491,261, filed on Apr. 28, 2017.

(51) Int. Cl.
*H04W 24/10* (2009.01)
*H04W 36/00* (2009.01)
*H04W 36/04* (2009.01)

(52) U.S. Cl.
CPC ........ *H04W 24/10* (2013.01); *H04W 36/0011* (2013.01); *H04W 36/0069* (2018.08); *H04W 36/0088* (2013.01); *H04W 36/04* (2013.01)

(58) Field of Classification Search
CPC .................................................. H04W 24/10
See application file for complete search history.

(56) References Cited

U.S. PATENT DOCUMENTS

2014/0341192 A1 11/2014 Venkob et al.
2015/0245235 A1 8/2015 Tang et al.
(Continued)

FOREIGN PATENT DOCUMENTS

KR 20130054371 5/2013
KR 20140081118 7/2014
(Continued)

OTHER PUBLICATIONS

Korean Notice of Allowance in Korean Application No. 10-2019-7031315, dated Apr. 7, 2020, 5 pages (with English translation).
(Continued)

*Primary Examiner* — James P Duffy
(74) *Attorney, Agent, or Firm* — Fish & Richardson P.C.

(57) ABSTRACT

A disclosure of the present specification provides a method by which a wireless device performs measurement. The method can include: a step for receiving information about a plurality of synchronization signal (SS) burst set periods from a serving cell; and a step for performing measurements on a plurality of neighbor cells on the basis of a measurement gap length (MGL) and a measurement gap repetition period (MGRP) set on the basis of the plurality of SS burst set periods. The MGL and the MGRP can be set in consideration of one or more among L, representing the largest value among the SS burst set periods, S, representing the smallest value among the SS burst set periods, D, representing a default value of the SS burst set period, and R, representing a radio frequency (RF) switching time of the wireless device.

12 Claims, 12 Drawing Sheets

(56) References Cited

U.S. PATENT DOCUMENTS

| | | | |
|---|---|---|---|
| 2015/0327104 A1 | 11/2015 | Yiu et al. | |
| 2016/0183173 A1 | 6/2016 | Harada et al. | |
| 2016/0301517 A1 | 10/2016 | Da | |
| 2017/0070312 A1 | 3/2017 | Yi et al. | |

FOREIGN PATENT DOCUMENTS

| | | |
|---|---|---|
| KR | 20160122227 | 10/2016 |
| KR | 20160128401 | 11/2016 |
| KR | 20160147774 | 12/2016 |
| KR | 20170036776 | 4/2017 |

OTHER PUBLICATIONS

Intel Corporation, "On measurement gap enhancement for Hetnet," R4-152763, 3GPP TSG-RAN WG4 Meeting #75, Fukuoka, Japan, dated May 25-29, 2015, 3 pages.

AT&T, "NR SS block and burst set composition and time Index Indication," R1-1704329, 3GPP TSG RAN WG1 Meeting #88bis, Spokane, USA, Apr. 3-7, 2017, 5 pages.

Samsung, "Measurement gap for NR," R2-1702981, 3GPP TSG-RAN WG2 Meeting #97bis, Spokane, WA, USA, Apr. 3-7, 2017, 5 pages.

EP Supplementary Search Report in European Application No. EP18790312, dated Dec. 17, 2019, 10 pages.

Intel Corporation, "Discussion on UE measurements for NR", R4-1702977, 3GPP TSG-RAN WG4 Meeting #82bis, Spokane, US, Apr. 3-7, 2017, 4 pages.

METHOD AND WIRELESS DEVICE FOR PERFORMING MEASUREMENT IN NR FOR 5G

CROSS-REFERENCE TO RELATED APPLICATIONS

This application is a National Stage application under 35 U.S.C. § 371 of International Application No. PCT/KR2018/004863, filed on Apr. 26, 2018, which claims the benefit of U.S. Provisional Application No. 62/491,261 filed on Apr. 28, 2017. The disclosures of the prior applications are incorporated by reference in their entirety.

BACKGROUND OF THE DISCLOSURE

Field of the Disclosure

The present disclosure relates to a generation mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

In 5G NR, a physical broadcast channel (PBCH) including information (i.e., MIB) required when a user equipment (UE) performs an initial access and a synchronization signal (SS) (including PSS and SSS) are defined as an SS block. In addition, an SS burst may be defined by grouping a plurality of SS blocks, and an SS burst set may be defined by grouping a plurality of SS bursts. Each SS block is assumed to be beamformed in a specific direction, and several SS blocks in the SS burst set are designed to support UEs existing in different directions.

On the other hand, an SS burst set periodicity used in NR may be configured differently between a serving cell and a neighboring cell and also between neighboring cells. In addition, a supported reception (Rx) beam width may vary depending on the UE.

However, since a measurement gap (MG) required for cell detection and measurement for an inter-frequency neighboring cell has not been researched so far, there has been a problem in that the UE cannot correctly detect and measure the inter-frequency neighboring cell.

SUMMARY OF THE DISCLOSURE

Accordingly, a disclosure of the present specification aims to solve the aforementioned problem.

To achieve the aforementioned aims, a disclosure of the present disclosure provides a method for performing measurement. The method may be performed by a wireless device and comprise: receiving information on a plurality of synchronization signal (SS) burst set periodicities from a serving cell; and performing measurement on a plurality of neighbor cells on the basis of a measurement gap length (MGL) and a measurement gap repetition period (MGRP) configured based on the plurality of SS burst set periodicities. The MGL and the MGRP may be configured in consideration of one or more values among L which denotes a greatest value among the SS burst set periodicities, S which denotes a smallest value among the SS burst set periodicities, D which denotes a default value of the SS burst set periodicity, and R which denotes a radio frequency (RF) switching time of the wireless device.

The method may further comprise receiving measurement configuration information including the MGL and the MGRP.

The method may further comprise configuring the MGL and the MGRP on the basis of the plurality of SS burst set periodicities.

The MGL may be configured by the equation of: MGL=D+2*R.

If L>D, the MGRP may be determined by the equation of MGRP=L. If L≤D, the MGRP may be determined by the equation of MGRP=N*D (where N is integer satisfying N≥2).

A start point of the MGL may vary depending on an MGL offset (MGLO) for each MGRP.

The method may further comprise transmitting information on a reception (Rx) beam of the wireless device to the serving cell. Herein, the SS burst set periodicities may be configured based on the information on the Rx beam.

The information on the Rx beam may include one or more of information on a Rx beam width and information on the number of Rx beams.

To achieve the aforementioned aims, a disclosure of the present disclosure provides a wireless device for performing measurement. The wireless device may include: a transceiver configured to receive information on a plurality of SS burst set periodicities from a serving cell; and a processor configured to perform measurement on a plurality of neighbor cells based on an MGL and an MGRP configured based on the plurality of SS burst set periodicities. The MGL and the MGRP may be configured in consideration of one or more values among L which denotes a greatest value among the SS burst set periodicities, S which denotes a smallest value among the SS burst set periodicities, D which denotes a default value of the SS burst set periodicity, and R which denotes an RF switching time of the wireless device.

According to the disclosure of the present disclosure, the problem of the conventional technology described above may be solved.

DESCRIPTION OF EXEMPLARY EMBODIMENTS

Figure 1:
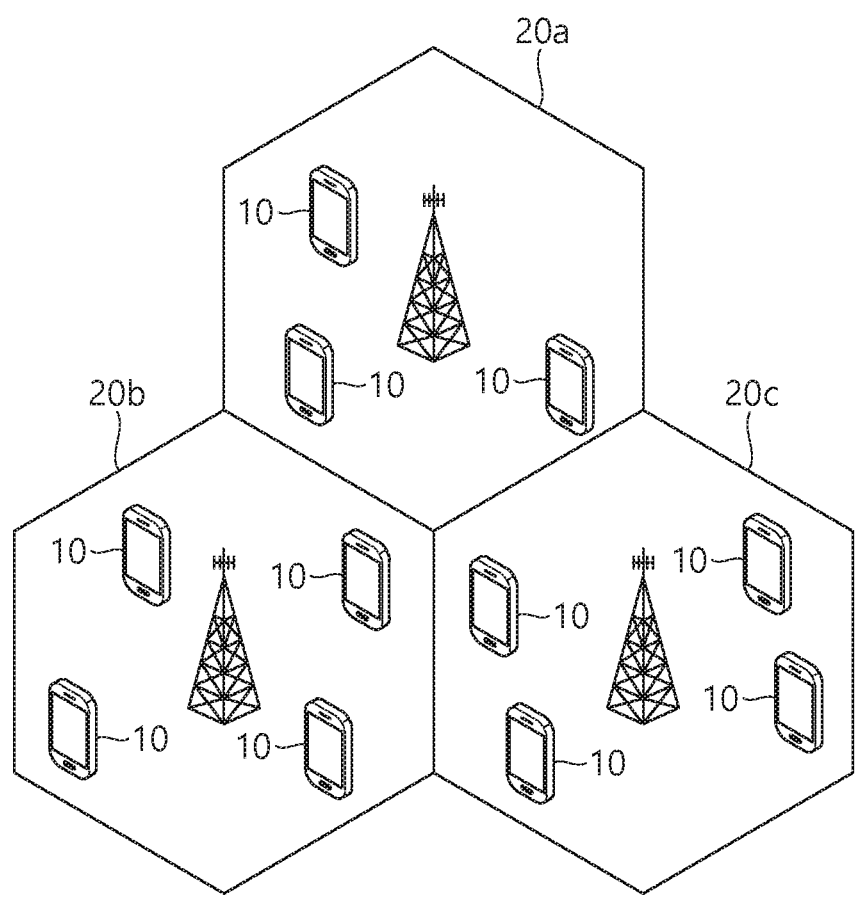
FIG. 1 is a wireless communication system.

Hereinafter, based on 3rd Generation Partnership Project (3GPP) long term evolution (LTE), 3GPP LTE-advanced (LTE-A), or 3GPP New RAT(NR), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into uplink transmission and downlink transmission, and thus downlink transmission performed by an eNB and uplink transmission performed by a UE can be simultaneously achieved. In a TDD system in which uplink transmission and downlink transmission are divided on a subframe basis, uplink transmission and downlink transmission are performed in different subframes.

Hereinafter, the LTE system will be described in detail.

Figure 2:
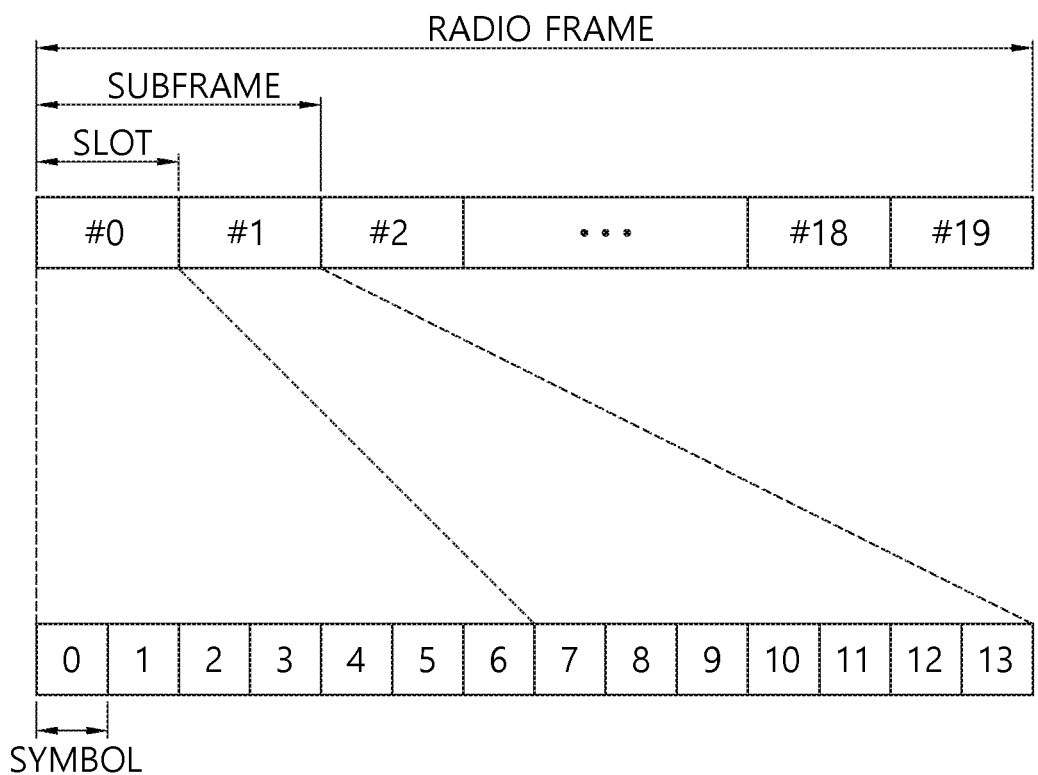
FIG. 2 illustrates a structure of a radio frame according to FDD in 3GPP LTE.

FIG. 2 shows a downlink radio frame structure according to FDD of 3rd generation partnership project (3GPP) long term evolution (LTE).

Referring to FIG. 2, the radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Moreover, one slot may include a plurality of orthogonal frequency division multiplexing (OFDM) symbols. The number of OFDM symbols included in one slot may vary depending on a cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

In the mobile communication system, mobility support of the UE 100 is required. Accordingly, the UE 100 continuously measures a quality of a serving cell providing a current service and the quality of a neighboring cell. The UE 100 reports a measurement result to the network at an appropriate time and the network provides optimum mobility to the UE through handover or the like. Often, measurement of such a purpose is referred to as radio resource management (RRM).

Meanwhile, the UE 100 monitors a downlink quality of a primary cell (Pcell) based on a CRS. This is referred to as radio link monitoring (RLM).

Figure 3:
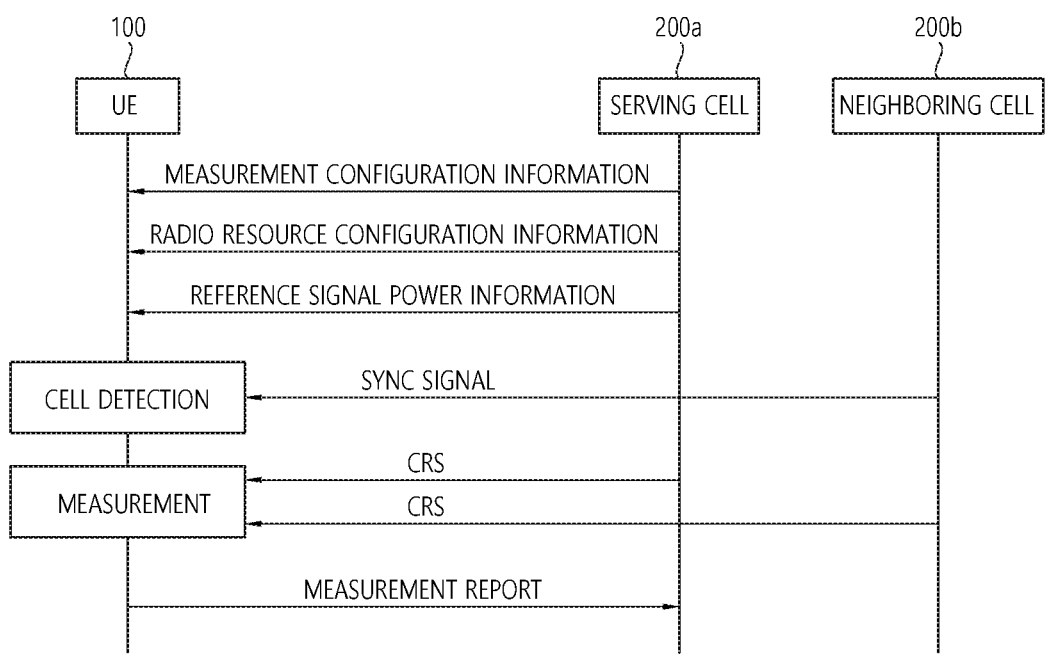
FIG. 3 shows a measurement and measurement reporting procedure.

FIG. 3 illustrates a cell detection and measurement procedure.

As can be seen with reference to from FIG. 3, the UE detects the neighboring cell based on a synchronization signal (SS) transmitted from the neighboring cell. The SS may include a primary synchronization signal (PSS) and a secondary synchronization signal (SSS).

In addition, when each of the serving cell 200a and the neighboring cell 200b transmits a cell-specific reference signal (CRS) to the UE 100, the UE 100 performs measure through the CRS and transmits a measurement result thereof to the serving cell 200a. In this case, the UE 100 compares power of the received CRS based on information on received reference signal power.

In this case, the UE 100 may perform the measurement by three following methods.

1) Reference signal received power (RSRP): represents average received power of all REs that carry the CRS transmitted over the entire band. In this case, the average received power of all REs that carry a channel state information (CSI)-reference signal (RS) instead of the CRS.

2) Received signal strength indicator (RSSI): represents received power measured in the entire band. The RSSI includes all of the signal, interference, and thermal noise.

3) Reference symbol received quality (RSRQ): represents the CQI and may be determined as the RSRP/RSSI depending on a measurement bandwidth or subband. That is, the RSRQ refers to a signal-to-noise interference ratio (SINR). The RSRP does not provide sufficient mobility information, the RSRQ may be used instead of the RSRP in the process of handover or cell reselection.

The RSRQ may be calculated as RSSI/RSSP.

Meanwhile, as illustrated in FIG. 3, the UE 100 receives a radio resource configuration information element (IE) from the serving cell 100a for the measurement. The radio resource configuration dedicated information element (IE) is used for configuring/modifying/canceling a radio bearer, modifying a MAC configuration, and the like. The radio resource configuration IE includes subframe pattern information. The subframe pattern information is information on a measurement resource restriction pattern on the time domain for measuring RSRP and RSRQ for a serving cell (for example, a primary cell).

Meanwhile, the UE 100 receives a measurement configuration (hereinafter also referred to as "measconfig") information element (IE) from the serving cell 100a for the measurement. A message including the measurement configuration information element (IE) is referred to as a measurement configuration message. Here, the measurement configuration information element (IE) may be received through an RRC connection reconfiguration message. When a measurement result satisfies a reporting condition in the measurement configuration information, the UE reports the measurement result to the base station. A message including the measurement result is referred to as a measurement report message.

The measurement configuration IE may include measurement object information. The measurement object information is information about an object to be measured by the UE. The measurement object includes at least any one of an intra-frequency measurement object which is an intra-cell measurement object, an inter-frequency measurement object which is an inter-cell measurement object, and an inter-RAT measurement object which is an inter-RAT measurement object. For example, the intra-frequency measurement object may indicate a neighbor cell having the same frequency band as a serving cell, the inter-frequency measurement object may indicate a neighbor cell having a different frequency band from the serving cell, and the inter-RAT measurement object may indicate a neighbor cell of am RAT different from the RAT of the serving cell.

TABLE 1

Description of measurement object field carrierFreq
This indicates the E-UTRA carrier frequency to which this configuration applies.
measCycleSCell
This indicates a cycle for measuring SCell in a deactivated state.
The value may be set to 160, 256, and the like. When the value is 160, measurement is performed every 160 subframes.

Meanwhile, the measurement configuration IE includes an IE (information element) as shown in table below.

TABLE 2

Description of MeasConfig field allowInterruptions
When the value is True, this indicates that when the UE performs measurements using MeasCycleScell for carriers of the deactivated TABLE 2-continued Description of MeasConfig field Scell, it is allowed to stop sending and receiving with the serving cell.
measGapConfig
Configure or release a measurement gap.

The measGapConfig is used to configure or release a measurement gap (MG). The measurement gap MG is a period for performing cell identification and RSRP measurement on an inter frequency different from the serving cell.

TABLE 3

Description of MeasConfig field gapOffset
The value of gapOffset may be set to either gp0 or gp1. gp0 corresponds to a gap offset of a pattern ID "0" having MGRP = 40 ms. Gp1 corresponds to a gap offset of a pattern ID "1"having MGRP = 40 ms.

TABLE 4

| Gap pattern Id | Measurement Gap Length (MGL) | Measurement Gap Repetition Period (MGRP) | Minimum time to perform measurement for inter-frequency and inter-RAT during period of 480 ms |
| --- | --- | --- | --- |
| 0 | 6 ms | 40 ms | 60 ms |
| 1 | 6 ms | 80 ms | 30 ms |

If the UE requires a measurement gap to identify and measure inter-frequency and inter-RAT cells, the E-UTRAN (i.e., the base station) may determine a measurement gap (MG) having a constant gap period. The UE does not transmit or receive any data from the serving cell during the measurement gap period, retunes its RF chain to the inter-frequency, and then performs the measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Meanwhile, hereinafter, IoT will be described.

IoT refers to information exchange through the base station between IoT devices without accompanying human interaction and information exchange through the base station between an IoT device and a server. As such, IoT communication communicates via cellular base stations and thus is also referred to as cellular Internet of Things (CIoT).

Such IoT communication is a type of machine type communication (MTC). Therefore, the IoT device may be referred to as an MTC device.

Since the IoT communication has features that a transmission data amount is small and uplink or downlink data transmission and reception rarely occur, it is preferable to lower the cost of the IoT device and reduce battery consumption in accordance with a low data transmission rate. In addition, since the IoT device has a feature of low mobility, the channel environment is not almost changed.

As one method for low-cost IoT devices, regardless of a system bandwidth of the cell, the IoT device may use a sub-band of, for example, approximately 1.4 MHz.

IoT communication operating on such a reduced bandwidth may be called narrow band (NB) IoT communication or NB CIoT communication.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile BroadBand (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 4:
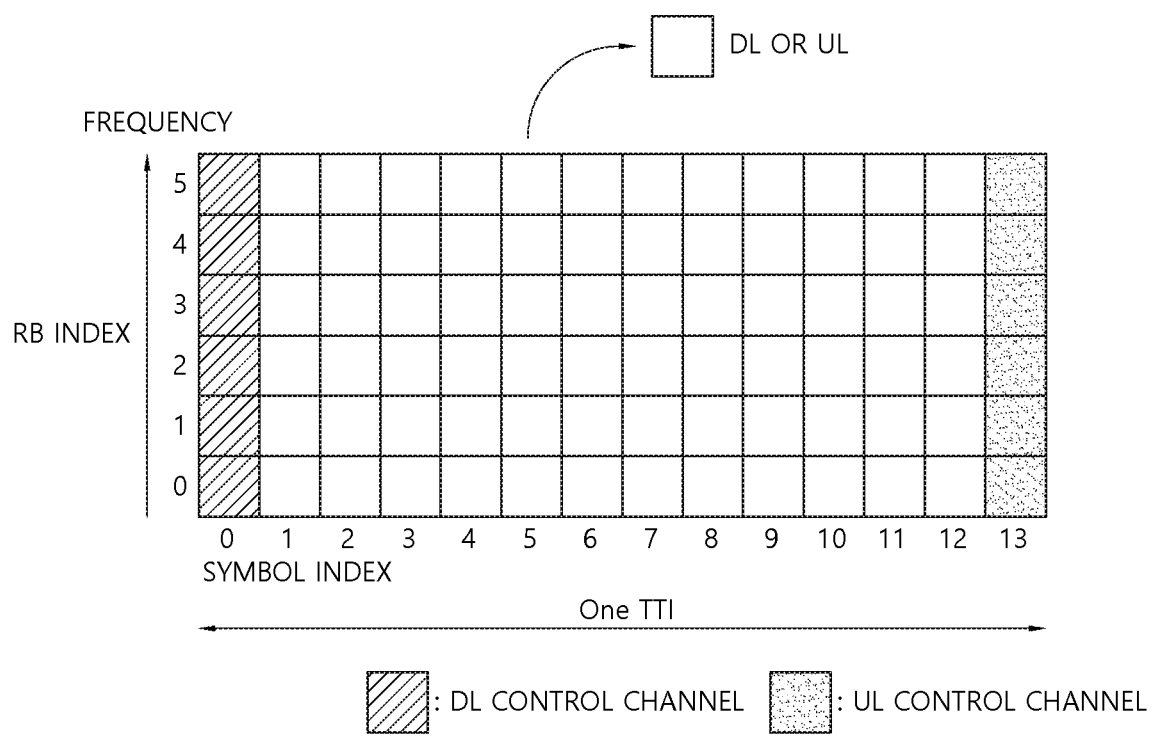
FIG. 4 shows an example of a subframe type in NR.

FIG. 4 illustrates an example of a subframe type in NR.

A transmission time interval (TTI) shown in FIG. 4 may be referred to as a subframe or slot for NR (or new RAT). The subframe (or slot) of FIG. 4 may be used in a TDD system of NR (or new RAT) to minimize the data transmission delay. As illustrated in FIG. 4, a subframe (or slot) includes 14 symbols, like the current subframe. The front symbol of the subframe (or slot) may be used for a DL control channel, and the rear symbol of the subframe (or slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received within a subframe (or slot), and an uplink acknowledgment response (ACK/NACK) may be transmitted within the subframe (or slot). The structure of such a subframe (or slot) may be referred to as a self-contained subframe (or slot). The use of such a sub-frame (or slot) structure has an advantage that the time taken to retransmit the data where a receive error occurs is reduced and a latency time of the last data transmission may be minimized. In such a self-contained subframe (or slot) structure, a time gap may be required in a transition process from the transmission mode to the reception mode or from the reception mode to the transmission mode. To this end, some OFDM symbols at the time of switching from DL to UL in the subframe structure may be configured as a guard period (GP).

<Support of Various Numerologies>

In the next system, a number of numerologies may be provided to the UE with the development of a wireless communication technology.

The numerology may be defined by a cycle prefix (CP) length and a subcarrier spacing. One cell may provide a plurality of numerologies to the UE. When the index of the numerology is denoted by $\mu$, each subcarrier interval and corresponding CP length may be as shown in table below.

TABLE 5

| $\mu$ | $\Delta f = 2^\mu \cdot 15$ [kHz] | CP |
|---|---|---|
| 0 | 15 | Normal |
| 1 | 30 | Normal |
| 2 | 60 | Normal, extended |
| 3 | 120 | Normal |
| 4 | 240 | Normal |

In the case of a normal CP, when the index of the numerology is denoted by $\mu$, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 6

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 6-continued

| $\mu$ | $N^{slot}_{symb}$ | $N^{frame,\mu}_{slot}$ | $N^{subframe,\mu}_{slot}$ |
|---|---|---|---|
| 4 | 14 | 160 | 16 |
| 5 | 14 | 320 | 32 |

In the case of an extended CP, when the index of the numerology is denoted by $\mu$, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 7

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol in a symbol may be used as a downlink or as an uplink as shown in table below. In the following table, the uplink is denoted by U and the downlink is denoted by D. In Table below, X represents a symbol that may be used flexibly in the uplink or downlink.

TABLE 8

| Format | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | U | U |
| 30 | D | D | D | D | D | D | D | D | D | X | X | X | U | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |

TABLE 8-continued

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | X | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | D | X | U | U | U | U | U |
| 57 | D | D | D | D | X | X | D | D | D | D | D | X | X | U |
| 58 | D | D | X | X | U | U | D | D | D | X | X | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | X | U | D | D | X | X | X | X | U |

<SS block in NR>In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 5:
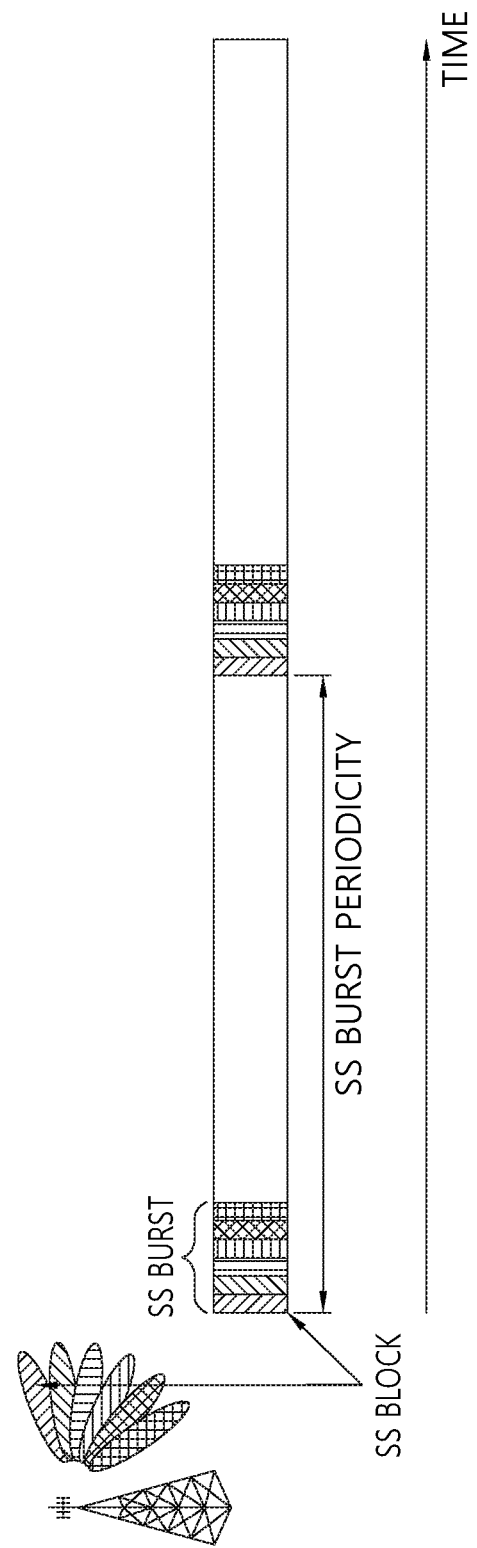
FIG. 5 shows an example of beam sweeping of a synchronization signal (SS) in NR.

FIG. 5 is an exemplary diagram illustrating an example of an SS block in NR.

Referring to FIG. 5, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 7.

Figure 6:
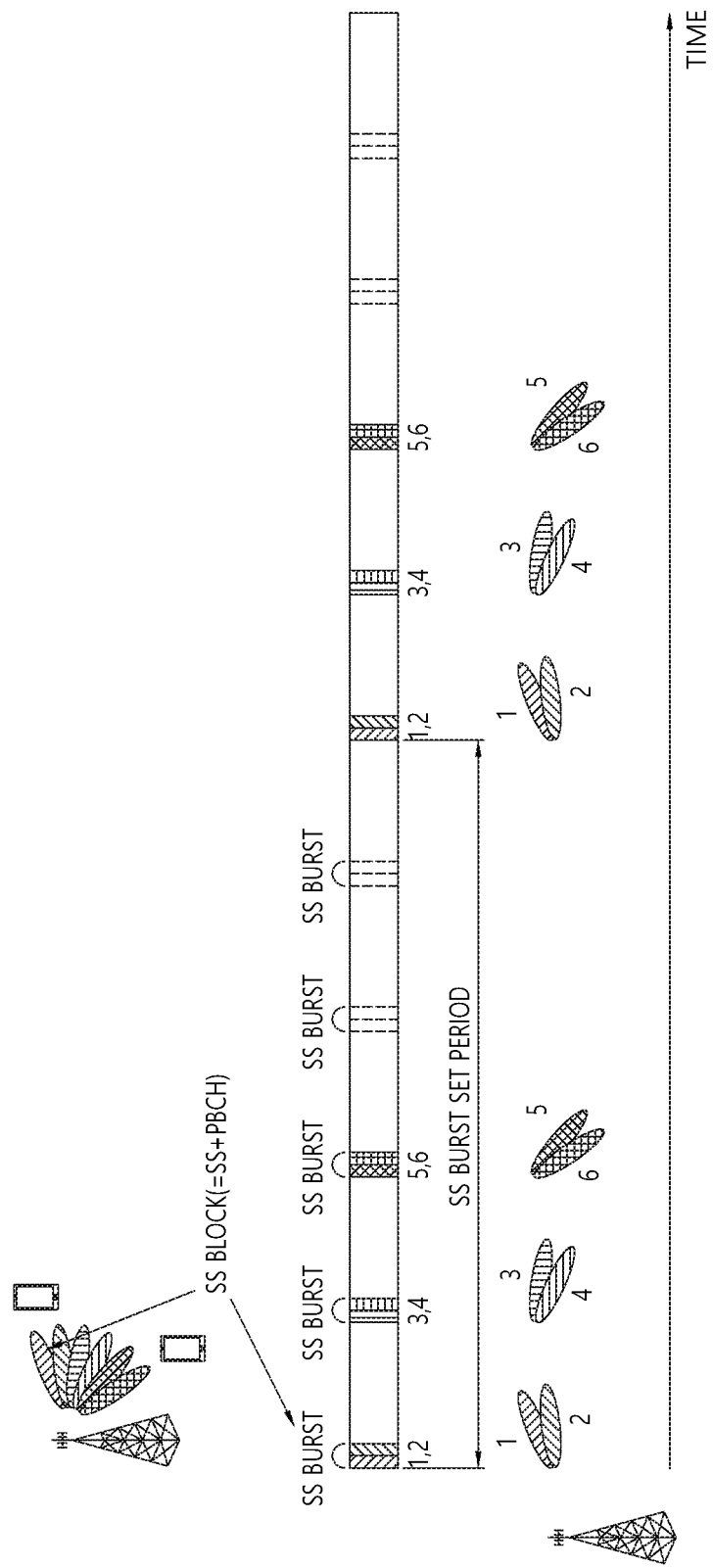
FIG. 6 shows a frequency position and periodicity of an SS burst.

FIG. 6 is an exemplary diagram illustrating an example of beam sweeping in NR.

The base station transmits each SS block in the SS burst with beam sweeping over time. At this time, the SS blocks in the SS burst set are transmitted in order to support UEs existing in different directions. In FIG. 6, the SS burst set includes SS blocks 1 to 6, and each SS burst includes two SS blocks.

<Disclosure of the Present Specification>

An inter-frequency cell/transmitting point (TP) or an inter-RAT cell/TP is identified, and a period for performing RSRP measurement is called a measurement gap (MG). A measurement gap length (MGL) is a time length of the MG. The MGL may be necessary or unnecessary according to an RF structure of a UE. For example, in order for a UE having only one RF unit to detect and measure an inter-frequency cell, the UE has to tune the RF unit. After turning the RF unit, the UE cannot communicate with a serving cell while performing inter-frequency cell detection and measurement. As such, since communication with the serving cell is interrupted, the UE requests the serving cell in advance to provide the MG, and the serving cell allocates the MG and provides it to the UE. When the cell detection and measurement are finished, the UE re-tunes the RF unit with a frequency of the serving cell.

On the other hand, a burst set periodicity of an SS used in NR may be configured differently between a serving cell and a neighboring cell and also between the neighboring cells. In addition, an Rx beam width to be supported may vary depending on the UE.

The present specification proposes a measurement gap (MG) required for SS-based cell detection and measurement in NR.

Meanwhile, cell identification in NR will be described below in greater detail.

A cell searching time in NR is different from a cell searching time in LTE. There are several factors to be considered such as a synchronization signal frequency raster, the number of SS blocks in an SS burst set, a UE burst set periodicity, and Rx beam capability in a UE side. The reason is that an NR cell identification time may be increased due to these factors. Details thereof are as follows.

First, a synchronization signal frequency raster will be described. Once an NR UE powers on, the UE has to search for a synchronization signal frequency on the raster. It may take more time depending on a size of a searching frequency window as well as a size of the synchronization signal frequency raster. The synchronization signal frequency raster may be defined by taking a minimum channel bandwidth into account. The minimum channel bandwidth may be 5 MHz and 50 MHz respectively at a frequency of 6 GHz and a frequency from 6 GHz to 52.6 GHz. A subcarrier spacing of a PSS/SSS may be 15 kHz/30 kHz for a frequency below 6 GHz, and may be 120 kHz/240 kHz for a frequency above 6 GHz.

Second, an SS block in an SS burst set will be described as follows. Basically, in an initial cell searching step, the NR UE tries to detect a proper (correct direction) SS block in an SS burst set with a default SS burst set periodicity of 20 ms.

Before cell detection, the UE does not know which value is configured as the SS burst set periodicity by a base station among values of {5, 10, 20, 40, 80, 160} ms. If a configured value is less than a default set periodicity (i.e., 5 ms or 10 ms), multiple SS blocks with the same beam index may be used for SS block detection within the default set periodicity of 20 ms. In contrast, if the configured value is greater than the default set periodicity (i.e., 40 ms, 80 ms, or 160 ms), 2, 4, and 8 times of the default set periodicity are needed to fully search an SS block from one SS burst set. Therefore, it seems not to be desirable to define a cell detection time having only the default SS burst set periodicity.

After cell detection, the UE may know a set of the configured values for the SS burst set periodicity. Herein, the configured values may be different for each carrier frequency, and the UE may perform each measurement with a value based on SS burst set periodicity information. SS block beam directions of the serving cell and the neighboring cell may be different from each other.

Third, UE beam capability in a receiving side will be described as follows. An SS burst set includes multiple SS blocks. Each SS block corresponds to one beam among whole beams swept by a base station (i.e., gNB). In order for the UE to detect a proper SS block, the UE shall perform multiple trials (i.e., the number of SS blocks in the SS burst set×the number of Rx beams in a UE side). Even if the number of SS blocks is identical in the SS burst set, a cell detection time may be different depending on the number of Rx beams of the UE. That is, an NR cell detection time is related to Rx beam capability of the UE.

On the other hand, the number of beams of the UE which fully covers one cell may be different in a case where a UE Rx beam width is great and a case where the UE Rx beam width is small. For example, it is assumed that the number of UE beams is 2 when the UE Rx beam width is great, the number of UE beams is 8 when the UE Rx beam width is small, and the number of SS blocks in the SS burst set periodicity is 8. The cases above respectively require 16(=2× 8) SS burst set periodicities and 64(=8×8) SS burst set periodicities to detect an SS block in a correct direction at a UE location. That is, the SS block detection time may be different depending on the number of Rx beams based on a size of the beam width of the UE. If the number of beams is great, a beam resolution is good, but the SS block detection time increases. This is equally applied to an RSRP measurement periodicity. For effective UE mobility management of a network, the SS detection time (i.e., cell detection time) and an RSRP measurement periodicity of an SSS shall be determined. Herein, there is a need to consider the number (resolution) of Rx beams of the UE together. Therefore, the UE needs to provide the network with information (i.e., capability information) on the number of Rx beams thereof or Rx beam width information. The beam width information may be a beam angle at which power is lower by about 3 dB with respect to a main lobe. If the beam angle is provided, the network may estimate the number of beams of the UE from the beam angle. If the number of UE Rx beams is K (or K is inferred from the beam angle), SS block detection is possible with M samples with respect to the same SS block, and the SS burst set periodicity is N, then it is expressed by the equation of 'SS block detection time=N*M*K SS burst set periodicity'. Therefore, the present specification proposes to inform the network of this equation and concept as well as the number of UE Rx beams.

In addition to the aforementioned three aspects, a measurement gap (MG) shall be improved for inter-frequency measurement and inter-RAT measurement in NR. The MG is used to measure inter-frequency neighboring cells after a UE having one RF chain detects a serving cell. In the legacy LTE, an MGL is designated to 6 ms. 5 ms out of the time of 6 ms corresponds to a periodicity of a synchronization signal, and 0.5 ms corresponds to an RF switching time. In addition, in the legacy LTE, a carrier frequency is below 6 GHz, and a subcarrier spacing (SCS) is 15 kHz. When the MG is improved for NR, the followings may be considered. In LTE, the periodicity of the synchronization signal may be replaced with a configuration value of the SS burst set periodicity. In addition, the RF switching time of 0.5 ms may be re-used at 6 GHz or below. However, whether the RF switching time of 0.5 ms can be re-used at 6 GHz or above shall be further studied. Also, when the SS burst set periodicity is configured differently for several neighboring cells, how to define the MGL shall be studied. For example, assume that there are three neighboring cells with different carrier frequencies and SS burst set periodicity values are configured respectively to 5 m, 20 m, and 80 ms. In this case, it may not be desirable to configure MGLs to be different from each other and configure MGRPs to be different from each other. The reason is that serving cell scheduling is inefficient, and management of the MG is significantly complicated. Therefore, it may be desirable to configure a common MGL as in LTE. In order to cover an SS block in the entire range while using the common MGL, the following three options may be considered.

Symbols used in the Following Options are as Follows.
L=greatest value among configured SS burst set periodicities
S=smallest value among configured SS burst set periodicities
D=default value of SS burst set periodicity (20 ms)
R=RF switching time The three options will be described below in greater detail with reference to FIG. 7 to FIG. 9.

Figure 7:
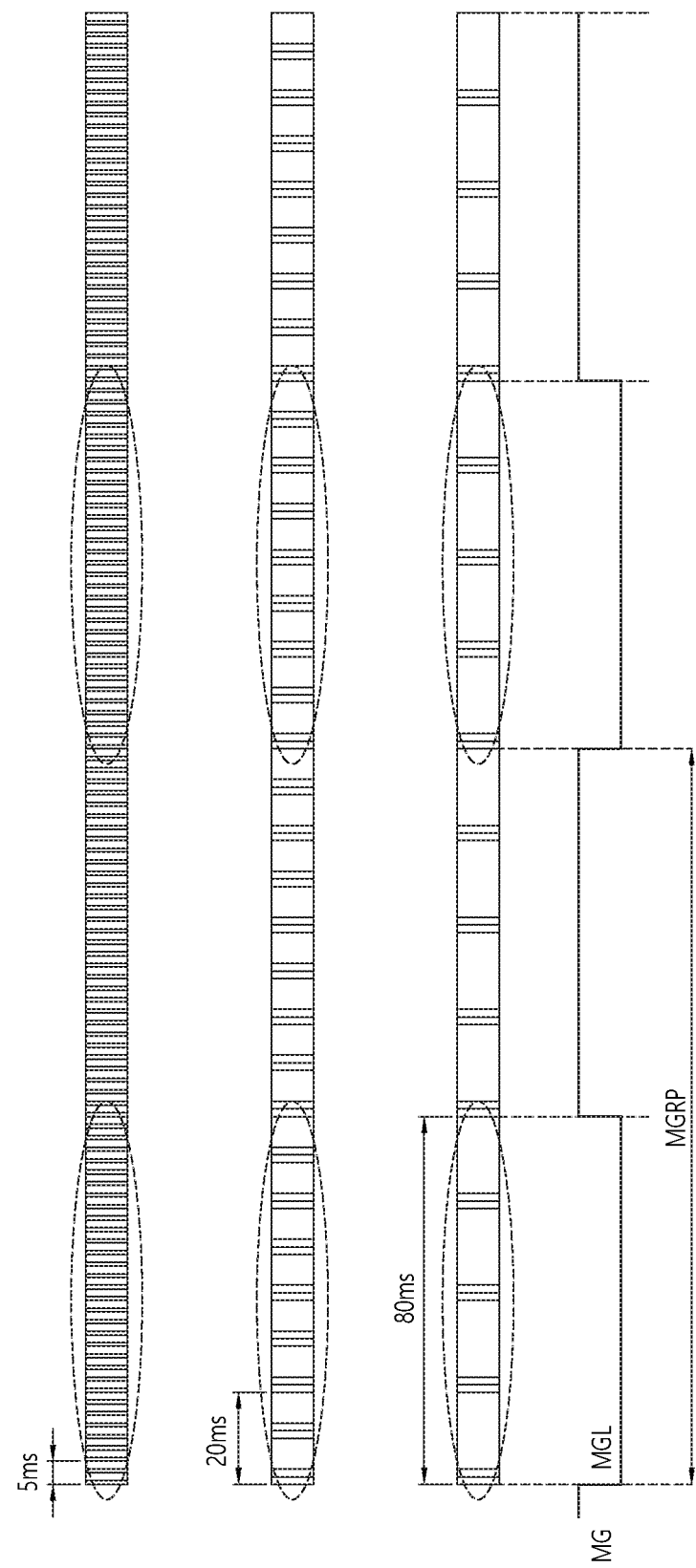
FIG. 7 shows an example of an option 1 according to a disclosure of the present specification.
Figure 8:
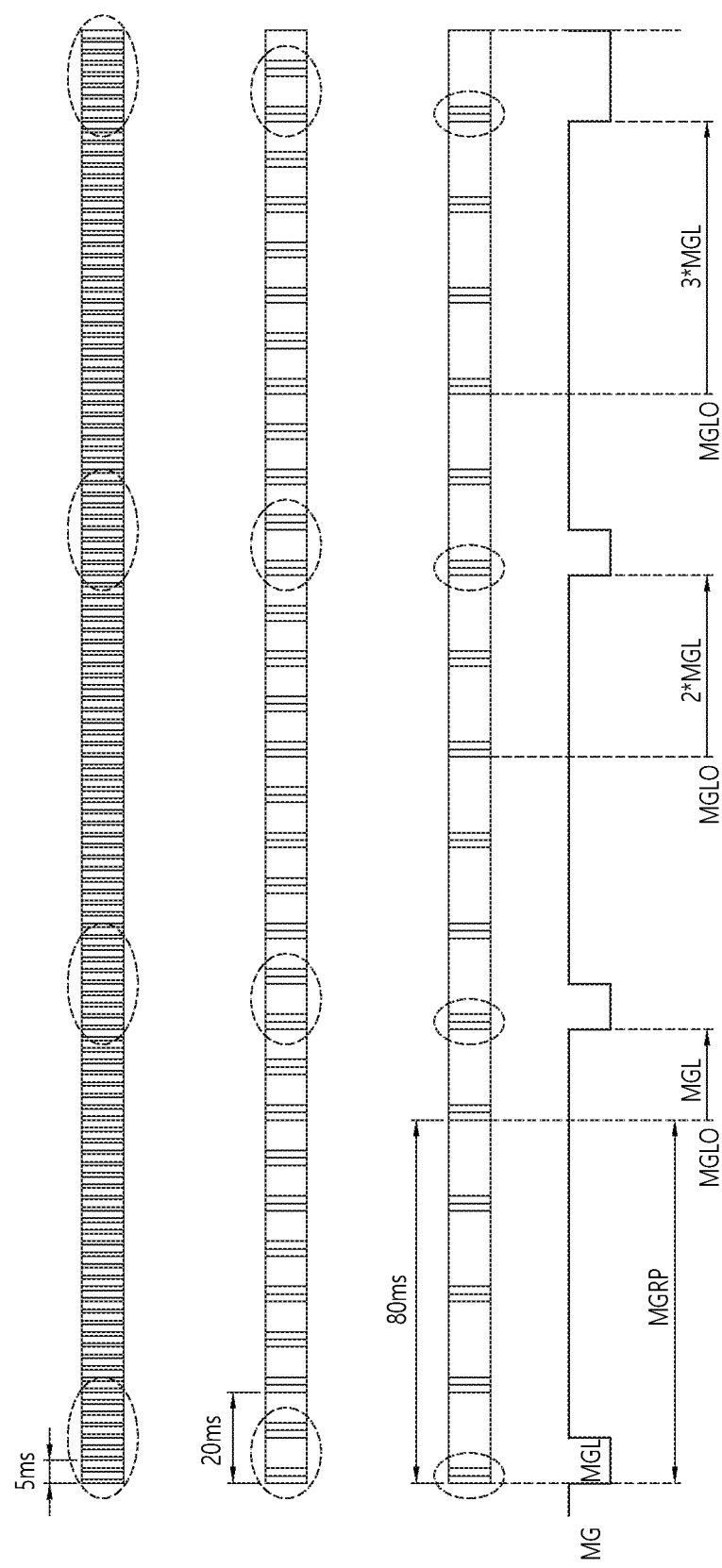
FIG. 8 shows an example of an option 2 according to a disclosure of the present specification.
Figure 9:
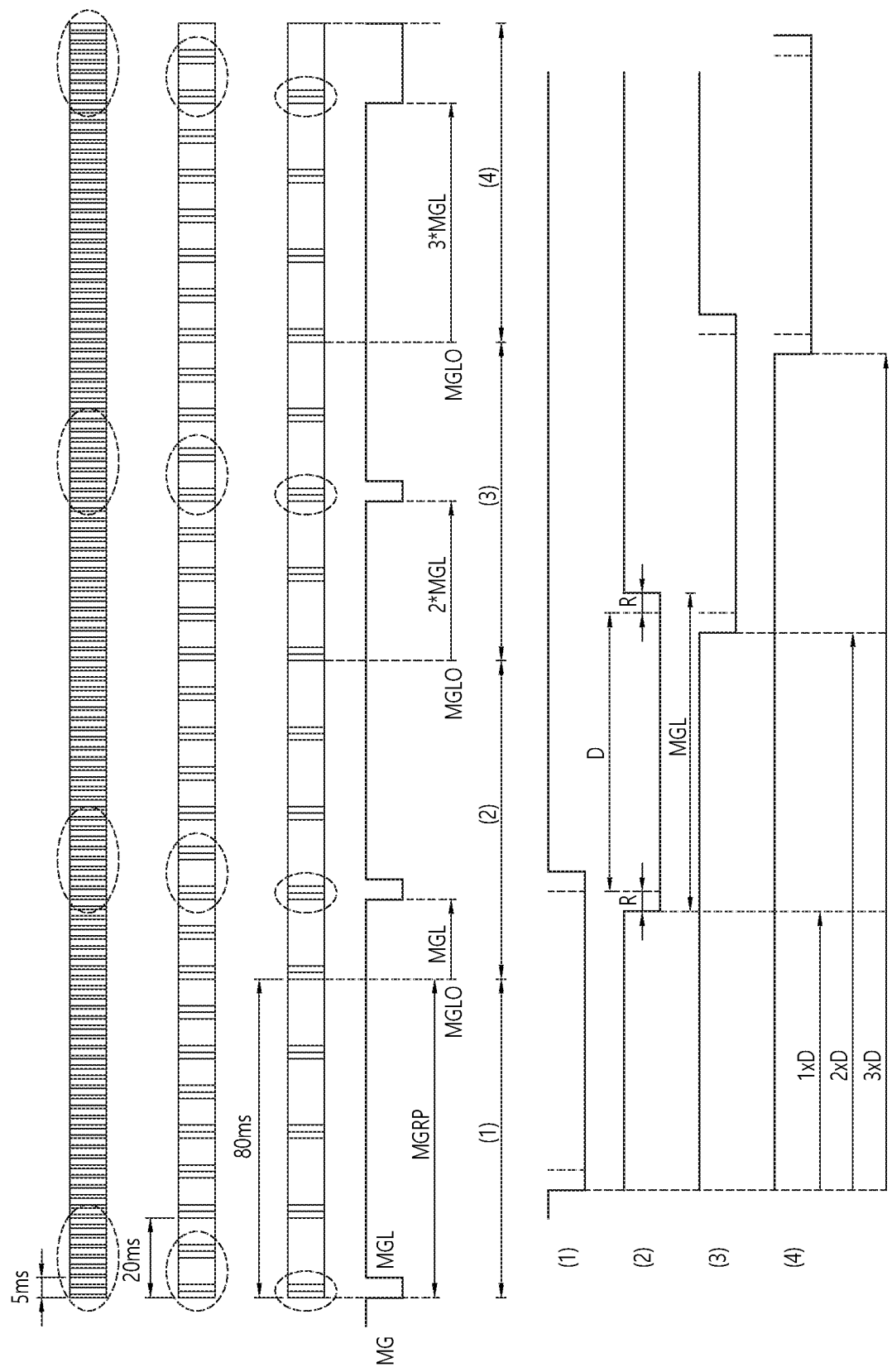
FIG. 9 shows an example of an option 3 according to the disclosure of the present specification.

FIG. 7 shows an example of an option 1 according to a disclosure of the present specification, FIG. 8 shows an example of an option 2 according to a disclosure of the present specification, and FIG. 9 shows an example of an option 3 according to the disclosure of the present specification.

Referring to FIG. 7, according to the option 1, an MGL and an MGRP may be determined as follows.

1) MGL=L+2*R
2) MGRP=N*L (herein, N is integer satisfying N≥2, and N may be set to a not-too-large integer to avoid a long cell detection time)

Referring to FIG. 8, according to the option 2, the MGL and the MGRP may be determined as follows.

1) MGL=D+2*R
2) The MGRP may be as follows.
If L>D, MGRP=L
In this case, an MGL offset (MGLO) may be applied by being changed for each MGRP to cover the entire range of SS blocks within SS burst set periodicity. For example, if D=20 ms, MGL=20 ms+2*R, and MGRP=80 ms in FIG. 8, the MGL offset may be changed to 0, 20, 40, 60 ms for each MGRP. This may be generalized as MGL offset=D× {0,1, . . . , Q}, Q=MGRP/D−1.
If L≤D, MGRP=N*D (herein, N is integer satisfying N≥2, and N may be set to a not-too-large integer to avoid a long cell detection time).

Referring to FIG. 9, according to the option 3, the MGL and the MGRP may be determined as follows.

1) MGL=S+2*R
2) The MGRP may be as follows.
If L≠S, MGRP=L.
In this case, an MGL offset (MGLO) may be applied by being changed for each MGRP to cover the entire range of SS blocks within SS burst set periodicity. For example, if S=10 ms, L=80 ms, MGL=10 ms+2*R, and MGRP=80 ms, the MGL offset may be changed to 0, 10, 20, 30, 40, 50, 60, 70 ms for each MGRP. This may be generalized as MGL offset=S×{0,1 . . . , Q}, Q=MGRP/S−1.
If L=S, MGRP=N*S (herein, N is integer satisfying N≥2, and N may be set to a not-too-large integer to avoid a long cell detection time).

Which one is better in management in terms of MG and efficiency is investigated as follows. The option 2 is better than option 1 in terms of providing a cell scheduling opportunity, but is not better in terms of a cell detection time. For example, this will be described as follows by comparing FIG. 7 showing the option 1 and FIG. 8 showing the option 2. A serving cell scheduling opportunity for 60 ms is 80 ms in case of the option 1 but 120 ms in case of the option 2. In addition, assuming three SS burst samples for cell detection with a probability of 90, the option 1 requires 800 ms (=1MGRP (5 ms)+1MGRP (20 ms)+3MGRP (80 ms), MGRP=160 ms). On the other hand, the option 2 requires 1200 ms (=1 MGRP (for 5 ms)+2 MGRP (for 20 ms)+12 MGRP (for 80 ms, MGRP=80 ms) to detect three different cells during this time. In FIG. 7 and FIG. 8, a dotted red circle represents an SS block detectable in an MGL in each drawing.

In summary, the cell detection time may be influenced by a synchronization signal frequency raster, the number of SS blocks of the SS burst set periodicity, the SS burst set periodicity, and Rx beam capability of the UE. As a result, the followings are proposed for NR cell detection.

Proposal 1: Considering the synchronization signal frequency raster, a PSS/SSS subcarrier spacing (SCS) of 15 kHz, 30 kHz, and 120 kHz may be considered respectively in case of 3 GHz or below, in case of 3 GHz to 6 GHz, and in case of 6 GHz or above.

Proposal 2: For an intra-frequency cell detection time, a UE Rx beam direction which is different between a serving cell and a neighboring cell shall be considered.

Proposal 3: In addition to the number of SS blocks in the SS burst set periodicity, the cell detection time shall consider Rx beam capability of the UE, i.e., Rx beam resolution.

Proposal 4: For inter-frequency/inter-RAT measurement, a common measurement gap pattern shall be used by considering effective management of a serving cell scheduling opportunity, a measurement gap, and a cell detection time.

Proposal 5: If the UE is provided with different sets of configuration of the SS burst set periodicity from the network, the UE shall use the common measurement gap.

Proposal 6: The common measurement gap may be configured according to one of the aforementioned three options.

Proposal 7: In the option 2 in which the common measurement gap L>D and the option 3 in which LAS, as shown in FIG. 9, the MGL offset may be defined based on an MGL start point including an RF switching time.

Proposal 8: The UE may inform the network of information on the number of Rx beams or information on a beam width (i.e., a left/right angle lower by 3 dB with respect to a main lobe). When the information on the Rx beam width of the UE is provided to the network, the network may estimate the number of UE Rx beams by using the beam width information.

Proposal 9: The network may calculate an SS block detection time of the UE and an SS measurement time or a report time on the basis of information on the number of Rx beams (or beam width) of the UE, and may manage scheduling and mobility on the basis of the calculation.

Figure 10:
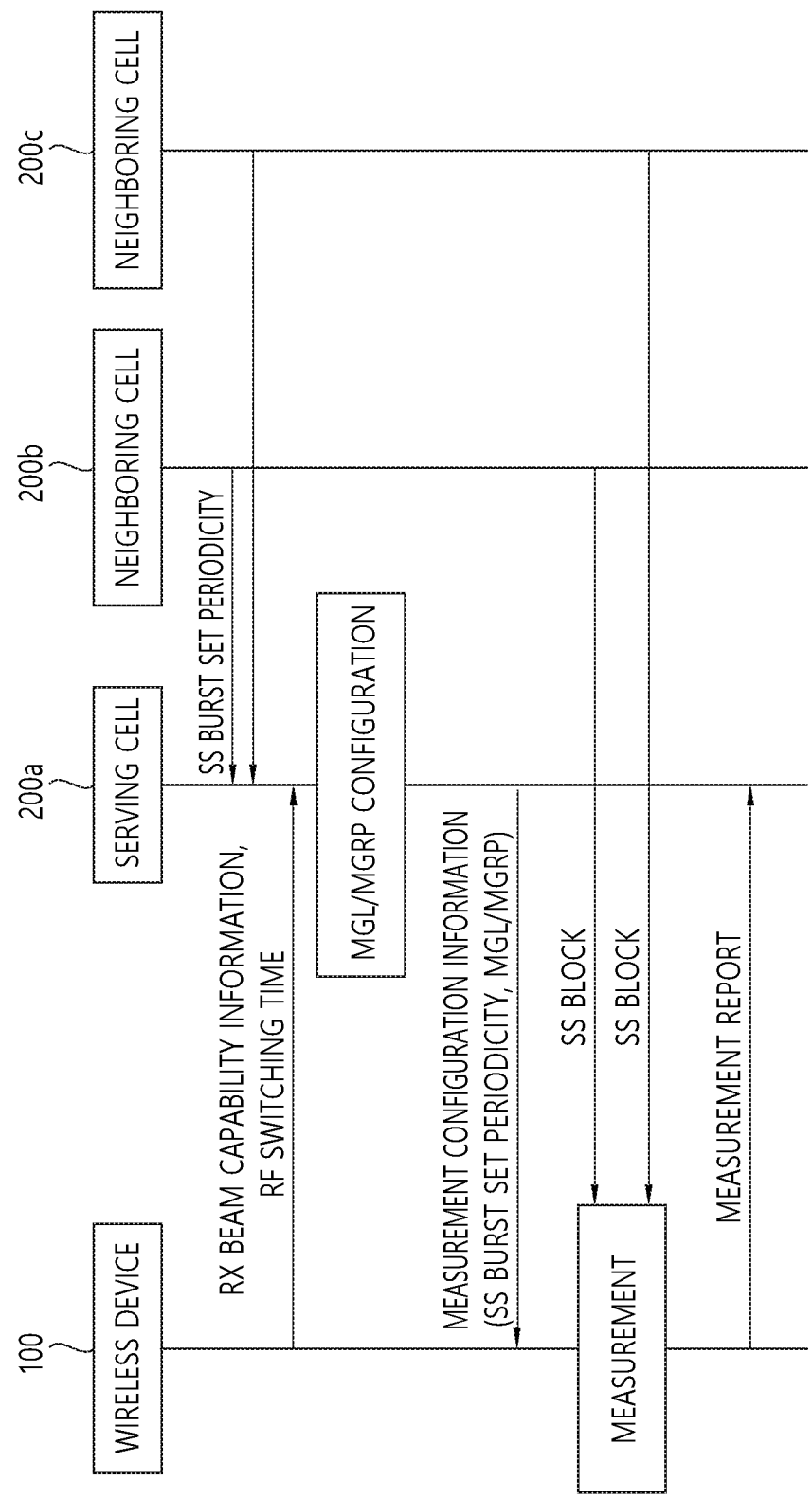
FIG. 10 is an exemplary flowchart showing a procedure according to a disclosure of the present specification.

FIG. 10 is an exemplary flowchart showing a procedure according to a disclosure of the present specification.

Referring to FIG. 10, a serving cell 200a receives information on an SS burst set periodicity from neighboring cells 200b and 200c.

A wireless device (or UE) 100 transmits one or more of information on Rx beam capability thereof (a beam count or a beam width) and information on an RF switching time to the serving cell 200a.

The serving cell 200a configures an MGL and/or an MGRP. The configuration of the MGL and/or MGPR may be performed based on any one of the aforementioned options 1 to 3. When the MGL/MGRP is configured, information on SS burst set periodicities of the neighboring cells 200b and 200c may be taken into account. In addition, when the MGL/MGRP is configured, the RF switching time of the wireless device may be taken into account.

The serving cell 200a may transmit measurement configuration information to the wireless device 100. The measurement configuration information may include information on the SS burst set periodicities of the neighboring cells 200b and 200c. The measurement configuration information may further include the configured MGL/MGRP.

The wireless device 100 performs measurement on one or more of the neighboring cells 200b and 200c. The measurement may be performed based on reception of an SS block. The measurement may be performed based on the received measurement configuration information. For example, if the wireless device 100 receives the MGL/MGRP through the measurement configuration information, the wireless device 100 may perform the measurement on the basis of the received MGL/MGRP. However, if the wireless device 100 fails to receive the MGL/MGRP, the wireless device 100 may autonomously configure the MGL and/or the MGRP on the basis of information on the SS burst set periodicities of the neighboring cells 200a and 200b. The configuration of the MGL and/or MGRP may be performed based on any one of the aforementioned options 1 to 3. When the MGL/MGRP is configured based on any one of the operations 1 to 3, information on the RF switching time of the wireless device may be further taken into account.

The embodiments of the present disclosure which has been described up to now may be implemented through various means. For example, the embodiments of the present disclosure may be implemented by hardware, firmware, software, or combinations thereof. In detail, the embodiments will be described with reference to the drawings.

Figure 11:
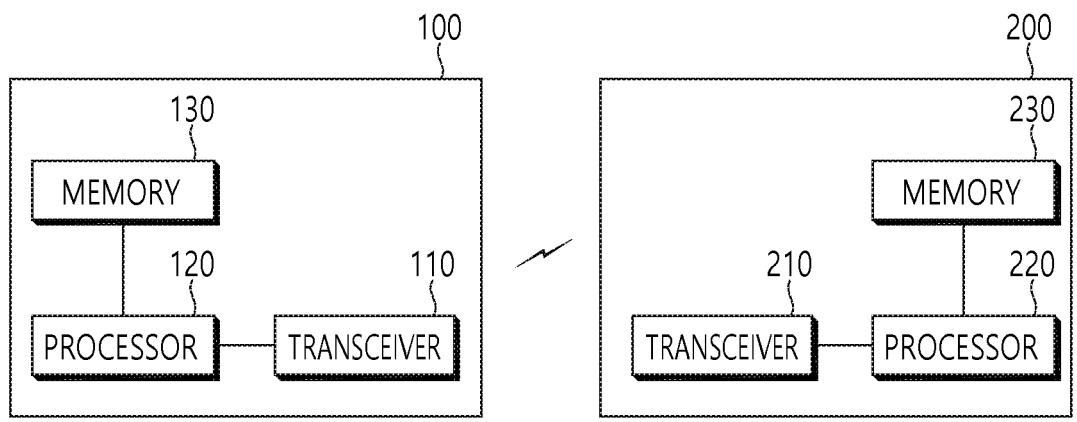
FIG. 11 is a block diagram illustrating a wireless device and a base station in which the disclosure of the present disclosure is implemented.

FIG. 11 is a block diagram illustrating a wireless device and a base station in which the disclosure of the present disclosure is implemented.

Referring to FIG. 11, a wireless device 100 and a base station 200 may implement the disclosure of this specification.

The illustrated wireless device 100 includes a processor 101, a memory 102, and a transceiver 103. Similarly, the illustrated base station 200 includes a processor 201, a memory 202, and a transceiver 203. The processors 101 and 201, the memories 102 and 202 and the transceivers 103 and 203 illustrated may be implemented as separate chips, or at least two blocks/functions may be implemented through a single chip.

The transceivers 103 and 203 include transmitters and receivers. When a specific operation is performed, only the operation of either the transmitter or the receiver may be performed, or both the transmitter and the receiver operations may be performed. The transceivers 103 and 203 may include one or more antennas that transmit and/or receive the radio signals. In addition, the transceivers 103 and 203 may include an amplifier for amplifying a reception signal and/or a transmission signal, and a band-pass filter for transmission on a specific frequency band.

The processors 101 and 201 may implement functions, processes, and/or methods proposed in this specification. The processors 101 and 201 may include encoders and decoders. For example, the processors 101 and 202 may perform operations according to the foregoing description. The processors 101 and 201 may include an application-specific integrated circuit (ASIC), another chipset, a logic circuit, a data processing device and/or a converter converting a baseband signal and the radio signal into each other.

The memories 102 and 202 may include a read-only memory (ROM), a random access memory (RAM), a flash memory, a memory card, a storage medium, and/or other storage devices.

Figure 12:
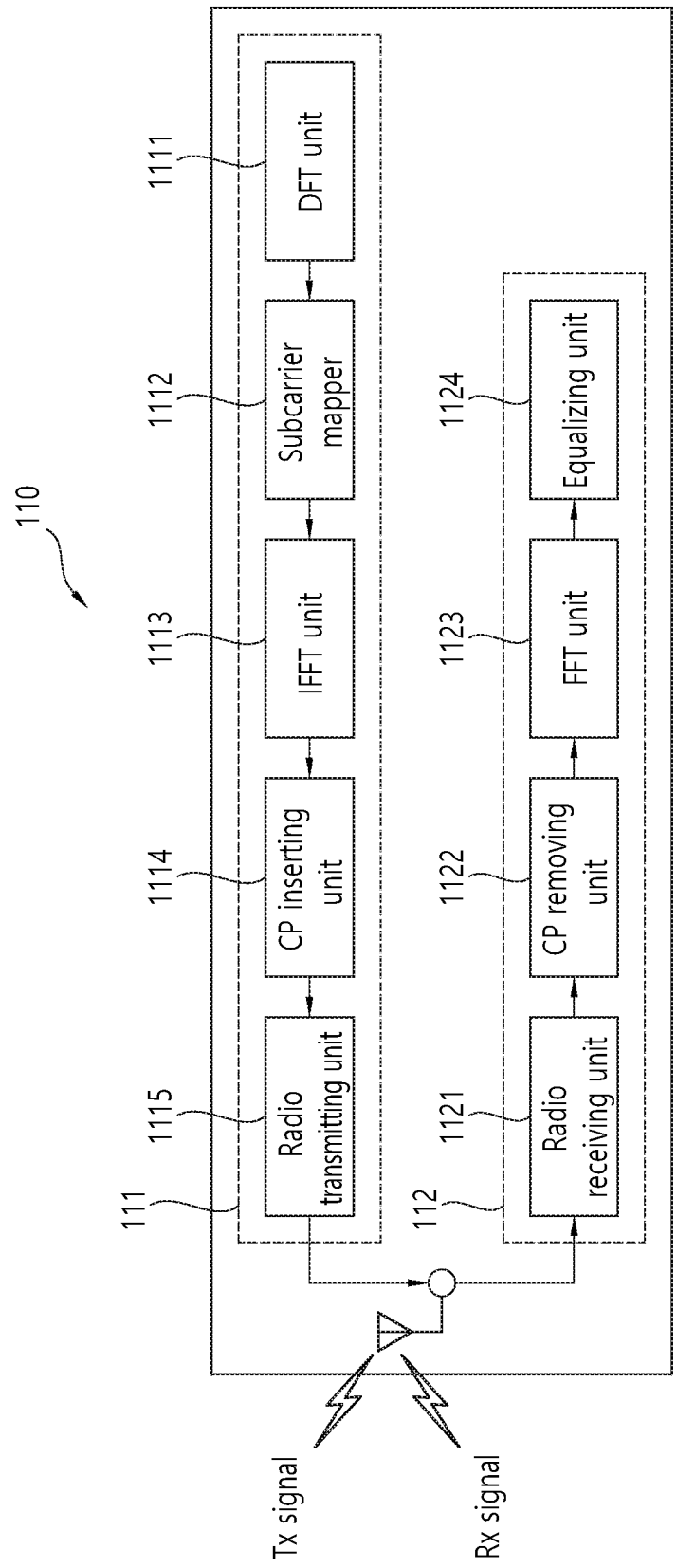
FIG. 12 is a detailed block diagram of a transceiver of a wireless device of FIG. 11.

FIG. 12 is a detailed block diagram of the transceiver of the wireless device illustrated in FIG. 10.

Referring to FIG. 12, the transceiver 110 includes a transmitter 111 and a receiver 112. The transmitter 111 includes a discrete Fourier transform (DFT) unit 1111, a subcarrier mapper 1112, an IFFT unit 1113, a CP inserting unit 11144, and a wireless transmitter 1115. The transmitter 111 may further include a modulator. The transceiver 110 may further include a scramble unit, a modulation mapper (not shown), a layer mapper, and a layer permutator, which may be arranged before the DFT unit 1111. That is, in order to prevent an increase in peak-to-average power ratio (PAPR), the transmitter 111 first passes information through the DFT 1111 before mapping a signal to a subcarrier. A signal spread (or precoded in the same sense) by the DFT unit 1111 is subcarrier-mapped through the subcarrier mapper 1112 and then made to a signal on a time axis through the inverse fast Fourier transform (IFFT) unit 1113.

The DFT unit 1111 performs DFT on the input symbols to output complex-valued symbols. For example, when Ntx symbols are input (however, Ntx is a natural number), the DFT size is Ntx. The DFT unit 1111 may be referred to as a transform precoder. The subcarrier mapper 1112 maps the complex-valued symbols to subcarriers in the frequency domain. The complex-valued symbols may be mapped to resource elements corresponding to resource blocks allocated for data transmission. The subcarrier mapper 1112 may be referred to as a resource element mapper. The IFFT unit 1113 performs IFFT on the input symbol and outputs a baseband signal for data, which is a time domain signal. The CP inserting unit 1114 copies a part of the rear part of the base band signal for data and inserts the copied rear part to the front part of the base band signal for data. Inter-symbol interference (ISI) and inter-carrier interference (ICI) are prevented through CP insertion, and orthogonality may be maintained in a multi-path channel.

On the other hand, the receiver 112 includes a wireless receiving unit 1121, a CP removing unit 1122, an FFT unit 1123, and an equalizing unit 1124. The wireless receiving unit 1121, the CP removing unit 1122 and the FFT unit 1123 of the receiver 112 perform a reverse function of the wireless receiving unit 1115, the CP removing unit 1114 and the FFT unit 1113 of the transmitter 111. The receiver 112 may further include a demodulator.

What is claimed is:

1. A method for performing measurement, the method performed by a device and comprising:
   receiving information regarding a measurement gap (MG),
   wherein the MG is used for performing the measurement,
   wherein the measurement is performed during a measurement gap length (MGL),
   wherein a start point of the measurement is determined based on a measurement gap repetition period (MGRP); and
   adjusting the start point of the measurement based on an offset,
   wherein the MGL and the MGRP are configured based on one or more values among L, S, D and R,
   where L denotes a greatest value among synchronization signal (SS) burst set periodicities,
   where S denotes a smallest value among the SS burst set periodicities,
   where D denotes a default value of the SS burst set periodicity, and
   where R denotes a radio frequency (RF) switching time of the device,
   wherein the MGL is configured by the equation MGL=D+ 2*R.

2. The method of claim 1, wherein the MGRP includes one of 40 ms or 80 ms.

3. The method of claim 1, wherein the MGL includes 6 ms.

4. The method of claim 1, wherein during the MGL, the device does not transmit an uplink signal and does not receive a downlink signal.

5. The method of claim 1, wherein based on L>D, the MGRP is determined by the equation MGRP=L, and
   wherein based on L≤D, the MGRP is determined by the equation MGRP=N*D,
   wherein N is an integer satisfying N≥2.

6. The method of claim 1, further comprising:
   identifying a new intra frequency cell based on the MG.

7. A device configured to perform measurement in a wireless communication system, the device comprising:
   a transceiver; and
   a controller configured to operate the transceiver to receive information regarding a measurement gap (MG),
   wherein the MG is used for performing the measurement,
   wherein the measurement is performed during a measurement gap length (MGL),
   wherein a start point of the measurement is determined based on a measurement gap repetition period (MGRP),
   wherein the controller is further configured to adjust the start point of the measurement based on an offset,
   wherein the MGL and the MGRP are configured based on one or more values among L, S, D and R,
   where L denotes a greatest value among synchronization signal (SS) burst set periodicities,
   where S denotes a smallest value among the SS burst set periodicities,
   where D denotes a default value of the SS burst set periodicity, and
   where R denotes a radio frequency (RF) switching time of the device,
   wherein the MGL is configured by the equation MGL=D+ 2*R.

8. The device of claim 7, wherein the MGRP includes one of 40 ms or 80 ms.

9. The device of claim 7, wherein the MGL includes 6 ms.

10. The device of claim 7, wherein during the MGL, the device is configured to not transmit an uplink signal and not receive a downlink signal.

11. The device of claim 7, wherein based on L>D, the MGRP is determined by the equation MGRP=L, and
    wherein based on L≤D, the MGRP is determined by the equation MGRP=N*D,
    wherein N is an integer satisfying N≥2.

12. The device of claim 7, wherein the controller is further configured to identify a new intra frequency cell based on the MG.

* * * * *